United States Patent
Cankaya

(10) Patent No.: US 7,573,875 B2
(45) Date of Patent: Aug. 11, 2009

(54) PROACTIVELY PROVIDING A REDUNDANT MULTICAST TREE IN AN INTERNET PROTOCOL TELEVISION (IPTV) NETWORK

(75) Inventor: Hakki Candan Cankaya, Dallas, TX (US)

(73) Assignee: Alcatel Lucent, Paris (FR)

( * ) Notice: Subject to any disclaimer, the term of this patent is extended or adjusted under 35 U.S.C. 154(b) by 432 days.

(21) Appl. No.: 11/419,236

(22) Filed: May 19, 2006

(65) Prior Publication Data
US 2007/0268899 A1 Nov. 22, 2007

(51) Int. Cl.
*H04L 12/28* (2006.01)
(52) U.S. Cl. ...................... 370/390; 370/401
(58) Field of Classification Search ............. 370/252, 370/254, 351, 389, 390, 392, 400, 401
See application file for complete search history.

(56) References Cited
U.S. PATENT DOCUMENTS

| | | | |
|---|---|---|---|
| 2002/0150094 A1* | 10/2002 | Cheng et al. | 370/389 |
| 2002/0150099 A1* | 10/2002 | Pung et al. | 370/390 |
| 2006/0085507 A1* | 4/2006 | Zhao et al. | 709/206 |
| 2006/0117321 A1* | 6/2006 | Lauer et al. | 719/313 |
| 2006/0156178 A1* | 7/2006 | Lee et al. | 714/758 |
| 2007/0047542 A1* | 3/2007 | Thukral | 370/389 |
| 2007/0058043 A1* | 3/2007 | Thukral | 348/180 |

\* cited by examiner

*Primary Examiner*—Hong Cho

(57) ABSTRACT

In certain embodiments, an Internet Protocol Television (IPTV) network comprises an operating multicast tree comprising a first set of nodes and components. The first set of nodes and components are operable to process an operating data stream to facilitate delivery of one or more channels to one or more endpoints. The IPTV network further comprises a proactively-established redundant multicast tree comprising a second set of nodes and components. The second set of nodes and components comprises at least one node or at least one component that is redundant of a corresponding node or component in the first set of nodes and components of the operating multicast tree, and that is not in the first set of nodes and components of the operating multicast tree, and are operable to process a redundant data stream. One or more buffers are operable to buffer the operating data stream and the redundant data stream.

20 Claims, 4 Drawing Sheets

PROACTIVELY PROVIDING A REDUNDANT MULTICAST TREE IN AN INTERNET PROTOCOL TELEVISION (IPTV) NETWORK

TECHNICAL FIELD OF THE INVENTION

This invention relates generally to content delivery systems and more particularly to proactively providing a redundant multicast tree in an Internet Protocol Television (IPTV) network.

BACKGROUND

The delivery of digital content over a network, such as a broadband network, has emerged as a desirable way to provide content to end users. For example, IPTV provides the ability to view television channels, video, audio, multimedia, and other digital content over a broadband connection. An IPTV data stream may be provided, at least in part, over a multicast tree in an IPTV network.

A failure in the multicast tree may result in an undesirable interruption of content delivery to one or more end users. Additionally, the IPTV data stream may comprise a plurality of packets. When one or more endpoints (e.g., set top boxes) detect an occurrence of a lost packet, a retransmission storm in the IPTV network may ensue, which may result in an interruption of content delivery to one or more end users.

SUMMARY

According to the present invention, disadvantages and problems associated with conventional IPTV networks may be reduced or eliminated.

In certain embodiments, the present invention comprises an IPTV network that comprises an operating multicast tree comprising a first set of nodes and components. The first set of nodes and components are operable to process an operating data stream to facilitate delivery of one or more channels to one or more endpoints. The IPTV network further comprises a proactively-established redundant multicast tree comprising a second set of nodes and components. The second set of nodes and components comprise at least one node or at least one component that is redundant of a corresponding node or component in the first set of nodes and components of the operating multicast tree, and that is not in the first set of nodes and components of the operating multicast tree, and are operable to process a redundant data stream. One or more buffers are operable to buffer the operating data stream and the redundant data stream.

In certain embodiments, the present invention comprises a server system in an IPTV network. The server system comprises one or more processing units and one or more memory units. The one or more processing units are collectively operable to receive an operating data stream associated with an operating multicast tree, the operating multicast tree comprising a first set of nodes and components that are operable to process the operating data stream to facilitate delivery of one or more channels to one or more endpoints. The one or more processing units are operable to receive a redundant data stream associated with a redundant multicast tree. The redundant multicast tree comprises a second set of nodes and components that: (1) comprises at least one node or at least one component that is redundant of a corresponding node or component in the first set of nodes and components, and that is not part of the operating multicast tree; and (2) is operable to process the redundant data stream. The one or more processing units are operable to buffer the operating data stream and the redundant data stream in one or more buffers.

Particular embodiments of the present invention may provide one or more technical advantages. In certain embodiments, in addition to redundancy at one or more of the node level and the component level of an IPTV network, the present invention may provide redundancy at the path level of the IPTV network. For example, the proactively-established redundant multicast tree and redundant data stream may proactively provide a backup for the operating multicast tree and the operating data stream.

In certain embodiments, the present invention may reduce or eliminate problems associated with conventional techniques for resolving a failure in an IPTV multicast tree. For example, certain embodiments may reduce or eliminate problems with performing a failover upon detection of a failure in an operating multicast tree of an IPTV network. As a particular example, the present invention may reduce or eliminate the need to update SSM translation tables, to wait for protocol independent multicast source specific mode (PIM-SSM) to build the multicast tree sourced from the second SHO with a component to which the failover is performed, or to perform other actions related to execution of a failover.

In certain embodiments, reducing or eliminating problems caused by conventional failover techniques may reduce or eliminate the possibility that an end user will be affected by a failure in the IPTV network, which may improve customer satisfaction. This may be especially true when there is a large customer base. In certain embodiments, the present invention uses the MICROSOFT instant channel change mechanism of delivery servers (D-Servers) in the IPTV network to accelerate resolution of failures.

In certain embodiments, the present invention improves the speed and/or efficiency with which the IPTV network handles lost packets. For example, certain embodiments may reduce or eliminate retransmission storms from one or more D-Servers to one or more acquisition servers (A-Servers). Certain embodiments may accelerate retransmission and reduce or eliminate requests from a D-Server to an A-Server for a detected lost packet. For example, in response to a request for a lost packet from an endpoint (e.g., a set top box), a D-Server may provide the lost packet from the redundant data stream of the redundant multicast tree rather than request the lost packet from the A-Server. This may be particularly beneficial if a large number of users are impacted by the occurrence of the lost packet, since the D-Server typically handles a smaller customer base relative to the A-Server. This may improve customer satisfaction by reducing or eliminating the likelihood that an end user will be affected by a lost packet.

In certain embodiments, the present invention may provide one or more of these or other advantages without excessively burdening the system due to the maintenance and processing associated with the addition of the redundant multicast tree. For example, assume that ten to twenty percent of the channels of the operating data stream are popular (defined, for purposes of this example, as seventy to eighty percent of the customer base watches those channels). Additionally, assume that there are approximately five hundred available channels (e.g., three hundred fifty standard definition channels and one hundred fifty high definition channels), and that these five hundred channels are delivered using approximately one thousand five hundred multicast trees (i.e., in certain embodiments, a channel may be delivered using multiple data streams, each forming its own multicast tree). If it is determined that only data for the popular channels should be included in the redundant data stream (e.g., ten to twenty percent of the channels of the operating data stream), then (350SD+150HD)*10%-20%=50-100 proactive redundant multicast trees. The fifty to one hundred proactive multicast trees is less than ten percent of the approximately one thousand five hundred total multicast trees, which may improve the experience of more than fifty percent of the customer base (i.e., the channels for which data is included in the redundant multicast stream are watched by seventy to eighty percent of the customer base, in this example).

Certain embodiments of the present invention may provide some, all, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present invention, and for further features and advantages thereof, reference is now made to the following description, taken in conjunction with the accompanying drawings, in which.

DESCRIPTION OF EXAMPLE EMBODIMENTS

Figure 1:
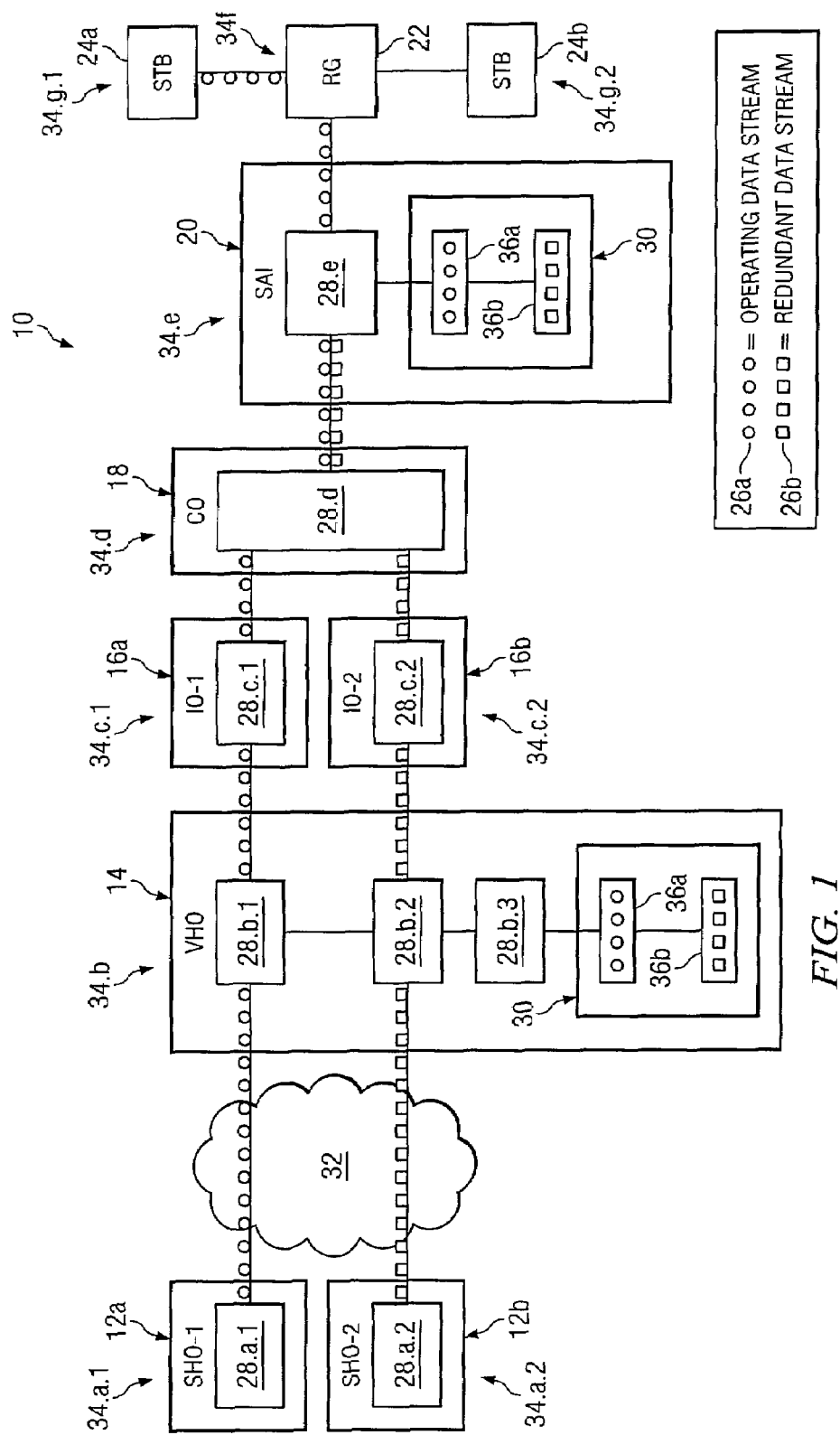
FIG. 1 illustrates an example system for proactively providing a redundant multicast tree in an IPTV network.

FIG. 1 illustrates an example system 10 for proactively providing a redundant multicast tree in an IPTV network. Throughout this description, system 10 may also be referred to as an IPTV network or an IPTV architecture. Although a particular implementation of IPTV network 10 is illustrated and primarily described, the present invention contemplates any suitable implementation of IPTV network 10, according to particular needs.

In the illustrated example, IPTV network 10 comprises one or more super headend offices (SHOs) 12, one or more video head offices (VHOs) 14, one or more intermediate offices (IOs) 16, one or more central offices (COs) 18, one or more service area interfaces (SAIs) 20, one or more residential gateways (RGs) 22, and one or more endpoints 24. In general, IPTV network 10 facilitates the delivery of at least a portion of a data stream 26 from SHOs 12 to one or more endpoints 24, via appropriate components of IPTV network 10, for display on a suitable display device such as, for example, a television or computer monitor, or for other suitable processing.

Each SHO 12 may comprise a main office of IPTV network 10 that is operable to capture and encode a national data feed of available television channels. For example, SHO 12 may receive the national feed of available television channels and convert the feed into a data streams, which may be packet-based. In certain embodiments, each SHO 12 may include one or more antennas, such as an antenna farm, for receiving the national data feed of television channels. Each SHO 12 may include one or more components 28.a. For example, components 28.a of SHOs 12 may include one or more switches, one or more routers, one or more server systems, or any other suitable devices. In a particular non-limiting example, components 28.a of each SHO 12 comprise one or more 7450 Ethernet Service Switches manufactured by ALCATEL or another suitable type of switch.

SHO 12a may be considered an operating SHO. For example, SHO 12a may carry the primary responsibility for providing a data stream 26 in IPTV network 10. In particular, SHO 12a may carry the responsibility for sourcing operating data stream 26a, which may be considered the primary data stream 26 in IPTV network 10. SHO 12b may be considered a redundant SHO. For example, SHO 12b may carry the responsibility for providing redundant data stream 26b in IPTV network 10, which may be considered a backup data stream to operating data stream 26a.

Data streams 26 may include digital content. Although the present invention contemplates any suitable type of digital content (e.g., digital video content, digital audio content, digital multimedia content), this description focuses on embodiments in which the digital content comprises data for one or more television channels (e.g., an IPTV data stream). In certain embodiments, data streams 26 may include packet-based streams of data.

VHO 14 may comprise a regional office of IPTV system 10 that is operable to provide one or more local content inserts, such as local channels, local advertisements, or other suitable content inserts. VHO 14 may include one or more components 28.b. For example, components 28.b of VHO 14 may include one or more switches, one or more routers, one or more server systems, or any other suitable devices. In a particular non-limiting example, each of components 28.b.1 and 26.b.2 comprise a 7750 Service Router manufactured by ALCATEL or another suitable type of router. Component 28.b.3 may include a switch, such as for example one or more 7450 Ethernet Service Switches manufactured by ALCATEL or another suitable type of switch. Components 28.b.2 may be redundant of components 28.b.1. In certain embodiments, components 28.b.1 comprise operating components 28, while components 28.b.2 comprise redundant components 28. VHO 14 may include one or more A-Servers and one or more D-Servers 30.

A network 32 may couple SHOs 12 to VHO 14. For example, network 32 may comprise a national Internet Protocol (IP) network that couples SHOs 12 to one or more regional VHOs 14. Network 32 facilitates wireless or wireline communication. Network 32 may communicate, for example, IP packets, Frame Relay frames, Asynchronous Transfer Mode (ATM) cells, voice, video, data, and other suitable information between network addresses. Network 32 may include one or more local area networks (LANs), radio access networks (RANs), metropolitan area networks (MANs), wide area networks (WANs), all or a portion of the global computer network known as the Internet, and/or any other communication system or systems at one or more locations. SHO 12a and SHO 12b may be coupled to VHO 14 using by the same or a different network 32.

Each IO 16 may comprise a metropolitan area office of IPTV network 10 that is operable to perform any suitable processing of its associated data stream 26. Each IO 16 may include one or more components 28.c. For example, components 28.c of IOs 16 may include one or more switches, one or more routers, one or more server systems, or any other suitable devices. In a particular non-limiting example, components 28.c of each IO comprise one or more 7750 Service Router manufactured by ALCATEL or another suitable type of router.

IO 16a may be considered the operating IO 16. For example, IO 16a may carry the primary responsibility for processing operating data stream 26a in IPTV network 10. IO 16b may be considered a redundant IO 16. For example, IO 16b may carry the responsibility for processing redundant data stream 26b in IPTV network 10.

CO 18 may comprise a location of IPTV network 10 that comprises components 28.d for performing any suitable processing of data streams 26. Components 28.d of CO 18 may include one or more switches, one or more routers, one or more server systems, or any other suitable devices. In a particular non-limiting example, components 28.d of CO 18 comprise one or more 7450 Ethernet Service Switches manufactured by ALCATEL or another suitable type of switch.

SAI 20 may comprise a location of IPTV system 10 that comprises components 28.e for performing any suitable processing of data streams 26. For example, SAI 20 may comprise equipment located in a neighborhood that is ultimately operable to deliver IPTV data stream packets to endpoints 24 (via RGs 22, if appropriate). In general, SAI 20 comprises one or more server systems (e.g., D-Servers 30) that are operable to buffer data streams 26 and provide various functions to endpoints 24. Components 28.e of SAI 20 may include one or more switches, one or more routers, one or more server systems, or any other suitable devices. In a particular non-limiting example, components 28.e of SAI 20 comprise one or more one or more IP Digital Subscriber Line Access Multipliers (DSLAMs), such as the 7330 ISAM fiber-to-the-node (FTTN) ETSIs manufactured by ALCATEL, or another suitable type of DSLAM.

RG 22 may comprise a device, such as a router for example, that allows one or more residential devices to connect to IPTV network 10. For example, RG 22 may allow one or more devices associated with endpoints 24 (e.g., set-top boxes) to access data streams 26 of IPTV network 10. As just one particular example, RG 22 could connect a home's (or other location's) LAN to the Internet.

Endpoints 24 are operable to receive at least a portion of one or more data streams 26 and to process the portion such that content may be viewed on an appropriate display device, such as a television or computer monitor. For example, endpoints 24 may include a set-top box. Endpoints 24 may receive data for one or more channels of a data stream 26 and facilitate the display of one or more of those channels. Although endpoints 24 are primarily described as set-top boxes, the present invention contemplates any suitable component for receiving and displaying or otherwise processing content associated with data streams 26.

IPTV network 10 may comprise an operating multicast tree that comprises a first set of nodes 34 and components 28 of IPTV network 10. Each node 34 of the operating multicast tree may comprise one or more elements (e.g., SHOs 12, VHO 14, IOs 16, CO 18, SAI 20, RG 22, STBs 24, and their associated components 28) of IPTV network 10. In the illustrated example, the operating multicast tree comprises a root node 34.a.1. Root node 34.a.1 comprises SHO 12a in this example. The child nodes 34 and components 28 of the operating multicast tree are operable to process operating data stream 26a sourced from root node 34.a.1 (e.g., SHO 12a) of the operating multicast tree. The first set of nodes 34 and components 28 of the operating multicast tree of IPTV network 10 may include the following: node 34.a.1 (e.g., SHO 12a and components 28.a.1); node 34.b (e.g., VHO 14 and components 28.b.1); node 34.c.1 (e.g., IO 16a and components 28.c.1); node 34.d (e.g., CO 18 and components 28d); node 34.e (e.g., SAI 20 and components 28.e); node 34f (e.g., RG 22), and nodes 34.g (e.g., one or more endpoints 24). One or more endpoints 24 may comprise leaf nodes 34.g in the operating multicast tree. The nodes 34 of the operating multicast tree may be responsible for processing operating data stream 26a and for facilitating the delivery of one or more channels of operating data stream 26a to one or more endpoints 24.

IPTV network 10 may comprise a proactively-established redundant multicast tree that comprises a second set of nodes 34 and components 28 of IPTV network 10. Each node 34 of the redundant multicast tree may comprise one or more elements (e.g., SHOs 12, VHO 14, IOs 16, CO 18, SAI 20, RG 22, STBs 24, and their associated components 28) of IPTV network 10. In the illustrated example, the redundant multicast tree comprises a root node 34.a.2. Root node 34.a.2 comprises the redundant SHO 12b in this example. The child nodes 34 and components 28 of the redundant multicast tree are operable to process redundant data stream 26b sourced from root node 34.a.2 (e.g., SHO 12b) of the redundant multicast tree. The second set of nodes 34 and components 28 of the redundant multicast tree of IPTV network 10 may include the following: node 34.a.2 (e.g., SHO 12b and components 28.a.2); node 34.b (e.g., VHO 14 and components 28.b.2); node 34.c.2 (e.g., IO 16b and components 28.c.2); node 34.d (e.g., CO 18 and components 28d); node 34.e (e.g., SAI 20 and components 28.e); node 34f (e.g., RG 22), and nodes 34.g (e.g., one or more endpoints 24). One or more endpoints 24 may comprise leaf nodes 34.g in the redundant multicast tree, if appropriate. The nodes 34 of the redundant multicast tree may be responsible for processing redundant data stream 26b and for facilitating delivery of one or more channels of redundant data stream 26b to one or more endpoints 24, if appropriate.

Conventional IPTV networks may include a multicast tree and may include one or more redundant nodes or one or more redundant components at a node of the multicast tree. However, conventional IPTV networks do not include a proactively-established redundant multicast tree that is operable to process a proactively-provided redundant data stream substantially simultaneously to an operating multicast tree processing an operating data stream.

The redundant multicast tree may be sourced from redundant SHO 12b and may be delivered on a different generic routing encapsulation (GRE) tunnel in network 32 than the operating multicast tree. Although the GRE tunneling protocol is primarily described, the present invention contemplates any suitable tunneling protocol. Certain embodiments of the present invention may use IO disjoint Shortest Path Tree (SPT) by PIM-SSM tweaks, which may be performed by a video operations center (VOC) management system. Redundant data stream 26b may be processed by a redundant router (e.g., a 7750) as the Designated Router (DR) in VHO 14.

The second set of nodes 34 and components 28 that make up the redundant multicast tree may comprise at least one node 34 or at least one component 28 that is redundant of a corresponding node 34 or component 28 of the operating multicast tree, and that is not a part of the operating multicast tree. Redundancy may be at the node level or at the component level. Node-level redundancy may include a node 34 existing in the operating multicast tree and a substantially similar but distinct (either logically or physically) node 34 existing in the redundant multicast tree. In certain embodiments, the redundant node 34 comprises substantially similar components 28 as the operating node 34. In this example, node-level redundancy between the operating multicast tree and the redundant multicast tree exists at nodes 34.a and 34.c, with the redundant multicast tree comprising redundant components 28 at each of redundant nodes 34.a and 34.c. Component-level redundancy may include an operating instance of a component 28 and a redundant instance of the component 28 existing at a node 34 that is shared between the operating multicast tree and the redundant multicast tree. In this example, component-level redundancy exists at node 34.b. The present invention contemplates the operating multicast tree and the redundant multicast tree comprising any suitable combination of redundant nodes 34 and/or redundant components 28, according to particular needs.

In certain embodiments, operating data stream 26a of the operating multicast tree may be processed by a first set of components of network 32, while redundant data stream 26b of the redundant multicast tree may be processed by a second set of components of network 32. For example, operating data stream 26a of the operating multicast tree may be routed through a first set of devices of network 32, while redundant data stream 26b of the redundant multicast tree may be routed through a second set of devices of network 32. This redundancy in network 32 may provide additional stability in IPTV network 10.

The operating multicast tree and the redundant multicast tree may share one or more nodes 34 and/or one or more components 28. Sharing a node 34 or sharing a component 28 means that the node 34 or component 28 is a part of both the operating multicast tree and the redundant multicast tree. In the illustrated embodiment, for example, the operating multicast tree and redundant multicast tree comprise the following shared nodes 34: node 34.d and node 34.e. The operating multicast tree and the redundant multicast tree share node 34.b, but component-level redundancy exists at node 34.b. In particular, components 28.b.2 are redundant of components 28.b.1. Sharing a node 34 or component 28 may also be described as a lack of redundancy at that node 34 or component 28. In other words, in this example, the operating multicast tree and the redundant multicast tree lack redundancy at nodes 34.d and 34.e.

The amount of redundancy in the redundant multicast tree may help determine the likelihood that a failure in the operating multicast tree will also affect the redundant multicast tree. In certain embodiments, it may be desirable to maximize the number of redundant nodes 34 and components 28 and to minimize the number of shared nodes 34 and components 28, which may reduce the likelihood that a failure in the operating multicast tree will also affect the redundant multicast tree.

As described above, the nodes 34 and components 28 of the operating multicast tree may process operating data stream 26a sourced from SHO 12a. Operating data stream 26a may comprise data for a plurality of channels. In a particular embodiment, operating data stream 26a comprises data for all available channels in IPTV network 10. As described above, the nodes 34 and components 28 of the redundant multicast tree may process redundant data stream 26b sourced from SHO 12b. Redundant data stream 26b may include data for a subset of the plurality of channels of operating data stream 26a. The subset may include all or a portion of the plurality of channels of operating data stream 26a.

In certain embodiments, it may be desirable not to include data for all of the plurality of channels of operating data stream 26a in the subset of channels, to reduce processing and overhead or for other suitable purposes. For example, it may be desirable to select a particular subset of channels from the plurality of channels of operating data stream 26a and to include the data for the particular subset of channels in redundant data stream 26b. The criteria for selecting the subset of channels may include any suitable criteria. In certain embodiments, channels may be selected based on popularity such that data for the most popular channels is included in redundant data stream 26b. As another example, data for a channel may be included in the subset of channels based on a particular program to be shown on that channel (e.g., the Super Bowl).

In certain embodiments, one or more nodes 34 in either or both of the operating multicast tree and the redundant multicast tree of IPTV network 10 comprise a D-Server 30. D-Servers 30 may be operable to buffer operating data stream 26a of the operating multicast tree and redundant data stream 26b of the redundant multicast tree. In certain embodiments, it may be desirable for D-Servers 30 to be located at shared nodes 34 of the operating and redundant multicast trees. This may ensure that D-Servers 30 receive both operating data stream 26a and redundant data stream 26b. In the illustrated example, node 34.b (VHO 14) and node 34.e (SAI 20) each comprise a D-Server 30. Although described as D-Servers, the present invention contemplates IPTV network 10 comprising any suitable types of server systems for performing one or more of the functions described with reference to D-Servers 30. A particular example D-Server 30 is described in more detail below with reference to FIG. 5.

As used throughout this description, a server system (e.g., D-Server 30) may include one or more computers at one or more locations, which may be independent or may share data storage, communications, or other resources according to particular needs. Each computer may include one or more suitable input devices, output devices, mass storage media, processors, memory, communications interfaces, or other components for receiving, processing, storing, and communicating information according to the operation of IPTV network 10.

One or more nodes 34 of IPTV network 10 are operable to buffer both operating data stream 26a and redundant data stream 26b. For example, one or more nodes 34 of IPTV system 10 comprise one or more buffers 34 for buffering one or more of operating data stream 26a and redundant data stream 26b. In the illustrated example, nodes 34.b and 34.e each comprise a first buffer 34a for buffering operating data stream 26a and a second buffer 34b for buffering redundant data stream 26b. For example, D-Servers 32 of nodes 34.b and 34.e may be operable to buffer operating data stream 26a and redundant data stream 26b. In certain embodiments, a D-Server 30 may receive operating data stream 26a and redundant data stream 26b substantially simultaneously and may buffer operating data stream 26a in buffer 36a and redundant data stream 26b in buffer 36b substantially simultaneously.

Various nodes 34 and components 28 of IPTV network 10 may be connected to one another or to network 32 using one or more wireless or wireline links. These links may communicate, for example, IP packets, Frame Relay frames, ATM cells, voice, video, data, and other suitable information between network addresses. The links may include one or more LANs, RANs, MANs, WANs, all or a portion of the global computer network known as the Internet, and/or any other communication system or systems at one or more locations.

Although each of buffers 36a and 36b are primarily described as a single buffer, the present invention contemplates each of buffers 36a and 36b comprising multiple buffers. For example, buffer 36a may comprise a buffer for each channel of operating data stream 26a, and buffer 36b may comprise a buffer for each channel in the subset of channels of redundant data stream 26b.

The elements and arrangement of IPTV network 10 illustrated and primarily described are merely for exemplary purposes. Although particular numbers and types of elements of IPTV network 10 are illustrated and primarily described, it should be understood that IPTV system 10 may include any suitable numbers and types of elements. For example, the present invention contemplates network 10 including any suitable number and types of switches, routers, servers, server pools, computers, or other processing and/or network devices in any suitable combination. The elements of IPTV network 10 may be distributed geographically in any suitable manner at any suitable number of locations. Additionally or alternatively, one or more of the elements of network 10 may be located at the same geographical location.

Furthermore, it will be appreciated by those of ordinary skill in the art that, for ease of description, the embodiment of the operating multicast tree and the redundant multicast tree illustrated and described with reference to FIG. 1 is a simplified embodiment of these multicast trees. Typically, each of the operating multicast tree and the redundant multicast tree would comprise multiple VHOs 14, IOs 16, COs 18, SAIs 20, RGs 22 and endpoints 24, each forming nodes 34 in the trees. Additionally, for ease of description, the operating multicast tree and the redundant multicast tree have each been primarily described as a single tree processing operating data stream 26a that comprises a plurality of channels and redundant data stream 26b that comprises a subset of the plurality of channels, respectively. In certain embodiments, the data stream 26 for each channel may be considered its own multicast tree. For example, each channel in the plurality of channels of operating data stream 26 may be associated with its own operating multicast tree, and each channel in the subset of channels of redundant data stream 26b may be associated with its own redundant multicast tree. Moreover, in certain embodiments, each channel may be delivered using multiple data streams within operating data stream 26a, each forming its own multicast tree. For example, a channel may be delivered using multiple data streams within operating data stream 26a, each carrying a portion of the data for the channel. In this example, if the channel is a part of the subset of channels to be included in redundant data stream 26b, then redundant data stream 26b may include a redundant data stream for each of the multiple data streams for delivering the channel.

In operation of an example embodiment of IPTV network 10, the operating multicast tree may be established. In certain embodiments, establishing the operating multicast tree comprises determining one or more paths through various nodes 34 and components 28 of IPTV network 10 for the operating multicast tree. As described above, the operating multicast tree comprises a first set of nodes 34 and components 28 of IPTV network 10 that are operable to process operating data stream 26a to facilitate delivery of one or more channels to one or more endpoints 24. For purposes of this example, the operating multicast tree carries the primary responsibility for delivering content through IPTV network 10 to endpoints 24.

A redundant multicast tree may be proactively established. In certain embodiments, establishing the operating multicast tree comprises determining one or more paths through various nodes 34 and components 28 of IPTV network 10 for the redundant multicast tree. As described above, the redundant multicast tree comprises a second set of nodes 34 and components 28. At least one of a node 34 or component 28 of the redundant multicast tree is redundant of a corresponding node 34 or component 28 in the first set of nodes 34 and components 28 of the operating multicast tree, and that is not in the first set of nodes 34 and components 28 of the operating multicast tree. The second set of nodes 34 and components 28 of the redundant multicast tree are operable to process redundant data stream 26b.

Operating data stream 26a may be initiated on the operating multicast tree. For example, root node 34.a.1 of the operating multicast tree (e.g., SHO 12a) may begin delivering operating data stream 26a to the nodes 34 and components 28 of the operating multicast tree. Operating data stream 26a may comprise data for a plurality of channels.

A subset of the plurality of channels of operating data stream 26a may be determined for inclusion in redundant data stream 26b of the redundant multicast tree. The present invention contemplates the subset of channels including any suitable number of the channels of operating data stream 26a. For example, the subset may include all of the plurality of channels of operating data stream 26a. As another example, the subset may include those channels that are determined to be popular based on any suitable factors. As another example, the subset may include one or more channels that will be carrying a show that is particularly popular at a particular time (e.g., the Super Bowl).

Redundant data stream 26b may be proactively initiated on the redundant multicast tree. For example, root node 34.a.2 of the redundant multicast tree (e.g., SHO 12b) may proactively begin delivering operating data stream 26b to the nodes 34 and components 28 of the redundant multicast tree. Redundant data stream 26b may comprise data for the determined subset of the plurality of channels of operating data stream 26a that are included in redundant data stream 26b.

Operating data stream 26a and redundant data stream 26b may be buffered in one or more buffers 34. In certain embodiments, one or more D-Servers 30 or other suitable server systems of IPTV network 10 may buffer operating data stream 26a in a first buffer 34a and redundant data stream 26b in a second buffer 34b. In certain embodiments, operating data stream 26a and redundant data stream 26b are initiated and buffered substantially simultaneously such that the contents of first buffer 34a and second buffer 34b are substantially the same (i.e., for those channels in the subset of the plurality of channels).

Figure 2:
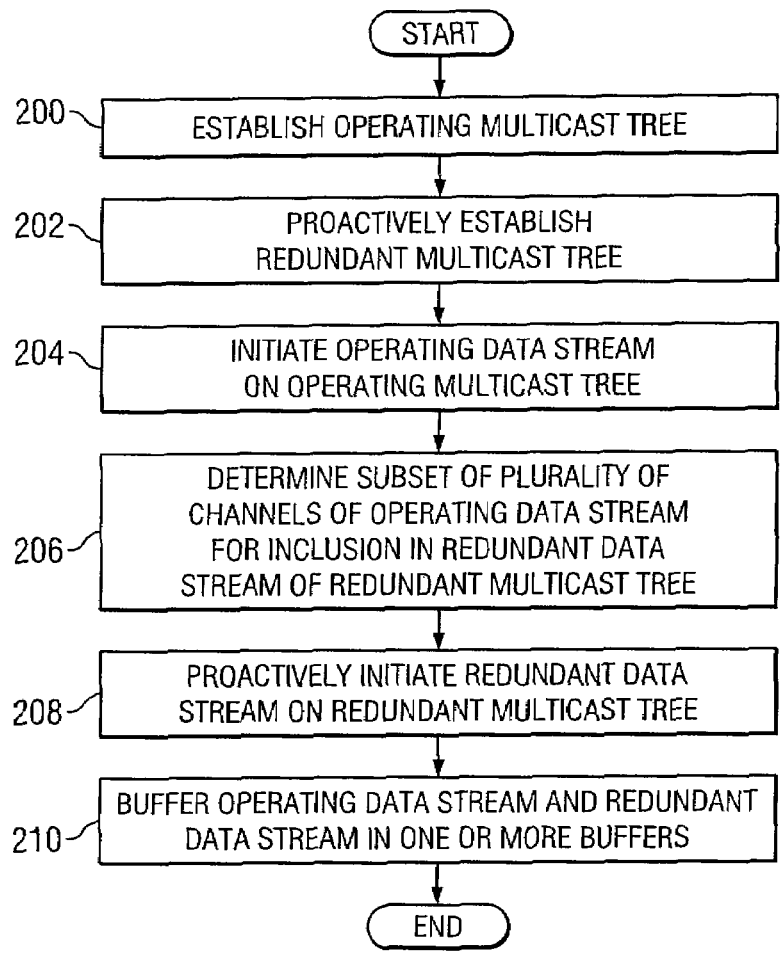
FIG. 2 illustrates an example method for proactively providing a redundant multicast tree in an IPTV network.

FIG. 2 illustrates an example method for proactively providing a redundant multicast tree in IPTV network 10. At step 200, an operating multicast tree may be established. In certain embodiments, establishing the operating multicast tree comprises determining one or more paths through various nodes 34 and components 28 of IPTV network 10 for the operating multicast tree. As described above, the operating multicast tree comprises a first set of nodes 34 and components 28 of IPTV network 10 that are operable to process operating data stream 26a to facilitate delivery of one or more channels to one or more endpoints 24. For purposes of this example, the operating multicast tree carries the primary responsibility for delivering content through IPTV network 10 to endpoints 24.

At step 202, a redundant multicast tree may be proactively established. In certain embodiments, establishing the operating multicast tree comprises determining one or more paths through various nodes 34 and components 28 of IPTV network 10 for the redundant multicast tree. As described above, the redundant multicast tree comprises a second set of nodes 34 and components 28. At least one of a node 34 or component 28 of the redundant multicast tree is redundant of a corresponding node 34 or component 28 in the first set of nodes 34 and components 28 of the operating multicast tree, and that is not in the first set of nodes 34 and components 28 of the operating multicast tree. The second set of nodes 34 and components 28 of the redundant multicast tree are operable to process redundant data stream 26b.

At step 204, operating data stream 26a may be initiated on the operating multicast tree. For example, root node 34.a.1 of the operating multicast tree (e.g., SHO 12a) may begin delivering operating data stream 26a to the nodes 34 and components 28 of the operating multicast tree. Operating data stream 26a may comprise data for a plurality of channels.

At step 206, a subset of the plurality of channels of operating data stream 26a may be determined for inclusion in redundant data stream 26b of the redundant multicast tree. The present invention contemplates the subset of channels including any suitable number of the channels of operating data stream 26a. For example, the subset may include all of the plurality of channels of operating data stream 26a. As another example, the subset may include those channels that are determined to be popular based on any suitable factors. As another example, the subset may include one or more channels that will be carrying a show that is particularly popular at a particular time (e.g., the Super Bowl).

At step 208, redundant data stream 26b may be proactively initiated on the redundant multicast tree. For example, root node 34.a.2 of the redundant multicast tree (e.g., SHO 12b) may proactively begin delivering operating data stream 26b to the nodes 34 and components 28 of the redundant multicast tree. Redundant data stream 26b may comprise data for the subset of channels determined at step 206.

At step 210, operating data stream 26a and redundant data stream 26b may be buffered in one or more buffers 34. In certain embodiments, one or more D-Servers 30 or other suitable server systems of IPTV network 10 may buffer operating data stream 26a in a first buffer 34a and redundant data stream 26b in a second buffer 34b. In certain embodiments, operating data stream 26a and redundant data stream 26b are initiated and buffered substantially simultaneously such that the contents of first buffer 34a and second buffer 34b are substantially the same (i.e., for those channels in the subset of the plurality of channels).

Although a particular method for proactively providing a redundant multicast tree in IPTV network 10 has been described with reference to FIG. 2, the present invention contemplates any suitable method for proactively providing a redundant multicast tree in IPTV network 10 in accordance with the present description. Thus, certain steps described with reference to FIG. 2 may take place simultaneously and/or in different orders than as illustrated and described. Moreover, components of network 10 may use methods with additional steps, fewer steps, and/or different steps, so long as the methods remain appropriate. Although certain components of IPTV network 10 are described as performing certain steps of the example method described with reference to FIG. 2, the present invention contemplates the steps being performed by any suitable components of IPTV network 10 in any suitable combination.

Returning to FIG. 1, the creation of the redundant multicast tree and the buffering of redundant data stream 26b at one or more nodes 34 of the redundant multicast tree are "proactive" in that they are performed prior to a time when the need arises for the redundancy. For example, conventional IPTV networks may include redundancy at the node level or component level. However, such conventional networks do not include a redundant multicast tree, a redundant data stream 26b, buffers for buffering the redundant data stream 26b, and other features of the present invention. The proactive establishment of the redundant multicast tree and the buffering of redundant data stream 26b at one or more nodes 34 of the redundant multicast tree may provide certain capabilities within IPTV network 10.

In certain embodiments, the present invention may improve the ability of an IPTV network to handle a failure in IPTV network 10, which may reduce or eliminate the possibility that the failure impacts the delivery of the one or more channels to one or more endpoints 24. A failure in the operating multicast tree may include any suitable type of failure. As particular examples, a failure the operating multicast tree may include an A-Server network interface card (NIC) failure, an encoder failure (e.g., a misfeed), hub failure at the SHO, failure of a router in network 10, or any other failure within the operating multicast tree that affects the operating data stream 26a.

Figure 3:
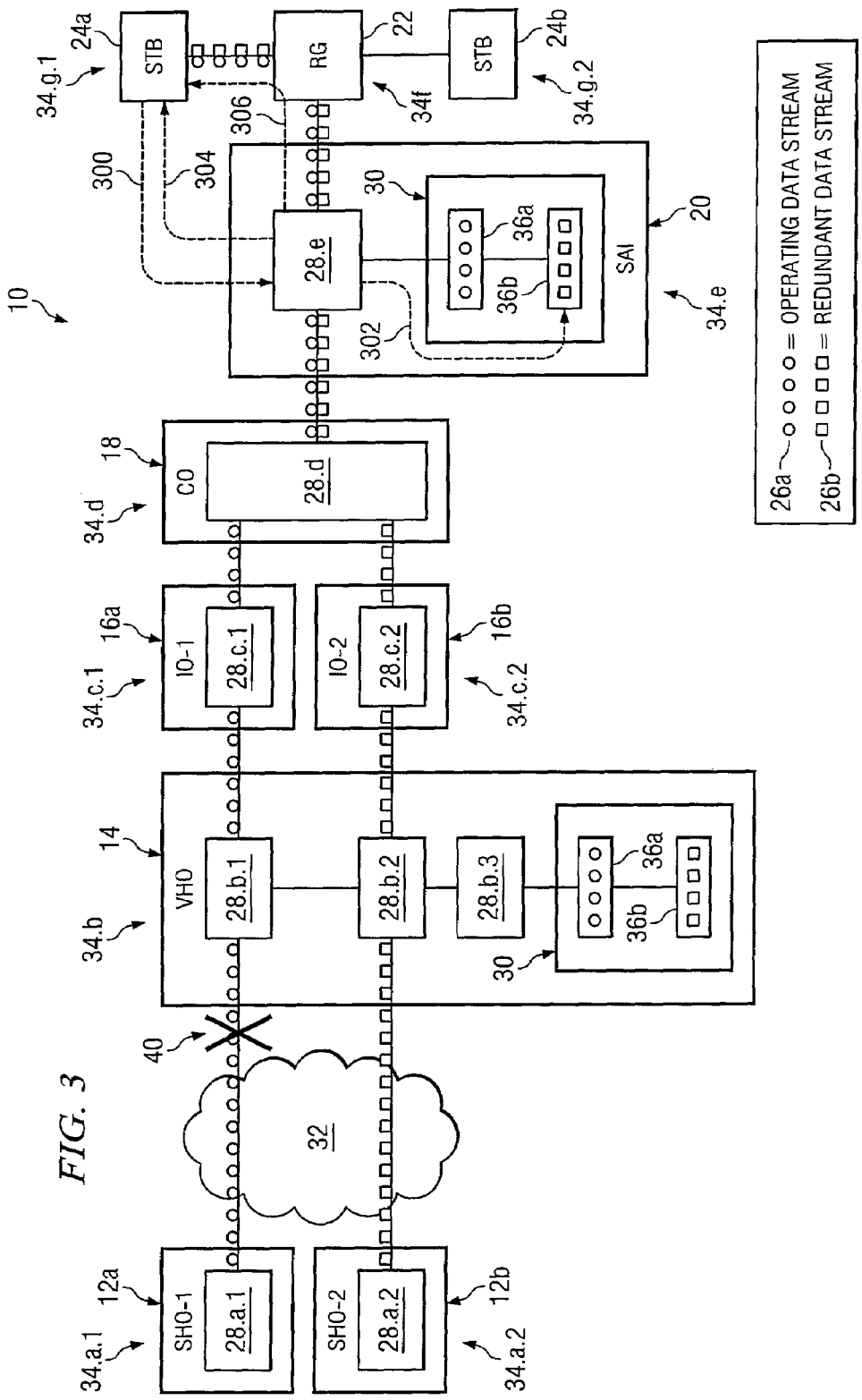
FIG. 3 illustrates example operation of an IPTV network in a scenario in which a failure occurs in an operating multicast tree of the IPTV network, according to certain embodiments of the present invention.

FIG. 3 illustrates example operation of IPTV network 10 in a scenario in which a failure occurs in the operating multicast tree of the IPTV network 10, according to certain embodiments of the present invention. For purposes of this example, it will be assumed that endpoint 24a is currently receiving one or more channels of operating data stream 26a as part of the operating multicast tree. In the example illustrated in FIG. 3, a failure 40 in the operating multicast tree of IPTV network 10 may occur. Although failure 40 is illustrated at a particular point in FIG. 3, the present invention contemplates failure 40 occurring at any suitable point in network 10. In certain embodiments, an endpoint 24 (e.g., endpoint 24a) may be a part of the operating multicast tree (e.g., as a leaf node) and may detect failure 40. For example, endpoint 24a may detect a discrepancy with operating data stream 26a, although the present invention contemplates any suitable component of network 10 detecting failure 40. In response to the detected discrepancy, as indicated at arrow 300, endpoint 24a may issue a leave from the operating multicast tree and communicate a request to D-Server 30 of SAI 20 for a unicast stream from redundant data stream 26b. The unicast request may include an identification of one or more channels to be included in the unicast stream from redundant data stream 26b.

D-Server 30 may receive the request from endpoint 24a (via RG 22, if appropriate). In response to the received request, D-Server 30 access redundant data stream 26b buffered in second buffer 36b of D-Server 30, as indicated at arrow 302. D-Server 30 may determine whether redundant data stream 26b buffered in second buffer 34b of D-Server 30 comprises data for the particular channel of the request. For example, as described above, the subset of channels of redundant data stream 26b may not include all channels of operating data stream 26a. Thus, it is possible that data for the one or more channels associated with the request is not a part of redundant data stream 26b.

If D-Server 30 determines that redundant data stream 26b buffered in second buffer 34b comprises data for the particular channel of the request, D-Server 30 may provide the particular channel to endpoint 24a using redundant data stream 26b buffered in second buffer 34b, as indicated at arrow 304. For example, D-Server 30 may provide, from redundant data stream 26b buffered in second buffer 34b, a unicast stream of data for the particular channel. Endpoint 24a may be added to the redundant multicast tree as a node 34 of the redundant multicast tree. For example, endpoint 24a may be added as a leaf node 34 of the redundant multicast tree. In certain embodiments, D-Server 30 and endpoint 24a may individually or collectively facilitate the addition of endpoint 24a to the redundant multicast tree. After endpoint 24a has been added to the redundant multicast tree, D-Server 30 may cease providing, as a unicast stream, the data for the particular channel provided from redundant data stream 26b buffered in second buffer 34b, and, as indicated at reference numeral 306, may provide data for the particular channel from redundant data stream 26b buffered in second buffer 34b to endpoint 24a as part of the redundant data stream of the redundant multicast tree (e.g., as a multicast stream rather than a unicast stream).

In certain embodiments, subsequent to resolving failure 40 in the operating multicast tree, endpoint 24a may be returned to the operating multicast tree, and D-Server 30 may provide the data for the particular channel from the operating data stream 26a buffered in first buffer 34a as part of operating multicast tree (e.g., as a multicast stream). For example, endpoint 24a may be terminated from the redundant multicast tree, the particular channel may be provided to endpoint 24a as a unicast signal from operating data stream 26a in first buffer 34a, endpoint 24a may be re-added as a node 34 (e.g., as a leaf node) to the operating multicast tree, and D-Server 30 may provide the data for the particular channel from the operating data stream 26a buffered in first buffer 34a as part of the operating multicast tree (e.g., as a multicast stream rather than a unicast stream).

If, in response to the request from endpoint 24a, D-Server 30 determines that redundant data stream 26b buffered in second buffer 34b does not comprise data for the particular channel of the request, D-Server 30 may provide the particular channel to endpoint 24a using conventional techniques.

In conventional IPTV networks, if a failure, such as failure 40, occurs in the operating multicast tree (i.e., the only active multicast tree in such conventional networks), a failover is executed in the network. The execution of these failovers may be time-consuming and may increase the likelihood that an endpoint 24 experiences an interruption in delivery of its data stream (e.g., an interruption in television service). In certain embodiments, the methodology and operation of network 10 described above reduces the time in during which a failure in the operating multicast tree interrupts television service to one or more endpoints 24.

Returning to FIG. 1, in certain embodiments, the present invention may improve the ability of an IPTV network to handle occurrences of lost packets in the IPTV network, which may reduce or eliminate the possibility that the occurrence of lost packets impacts delivery of one or more channels to endpoints 24. A lost packet may result from any suitable situation, according to particular needs.

Figure 4:
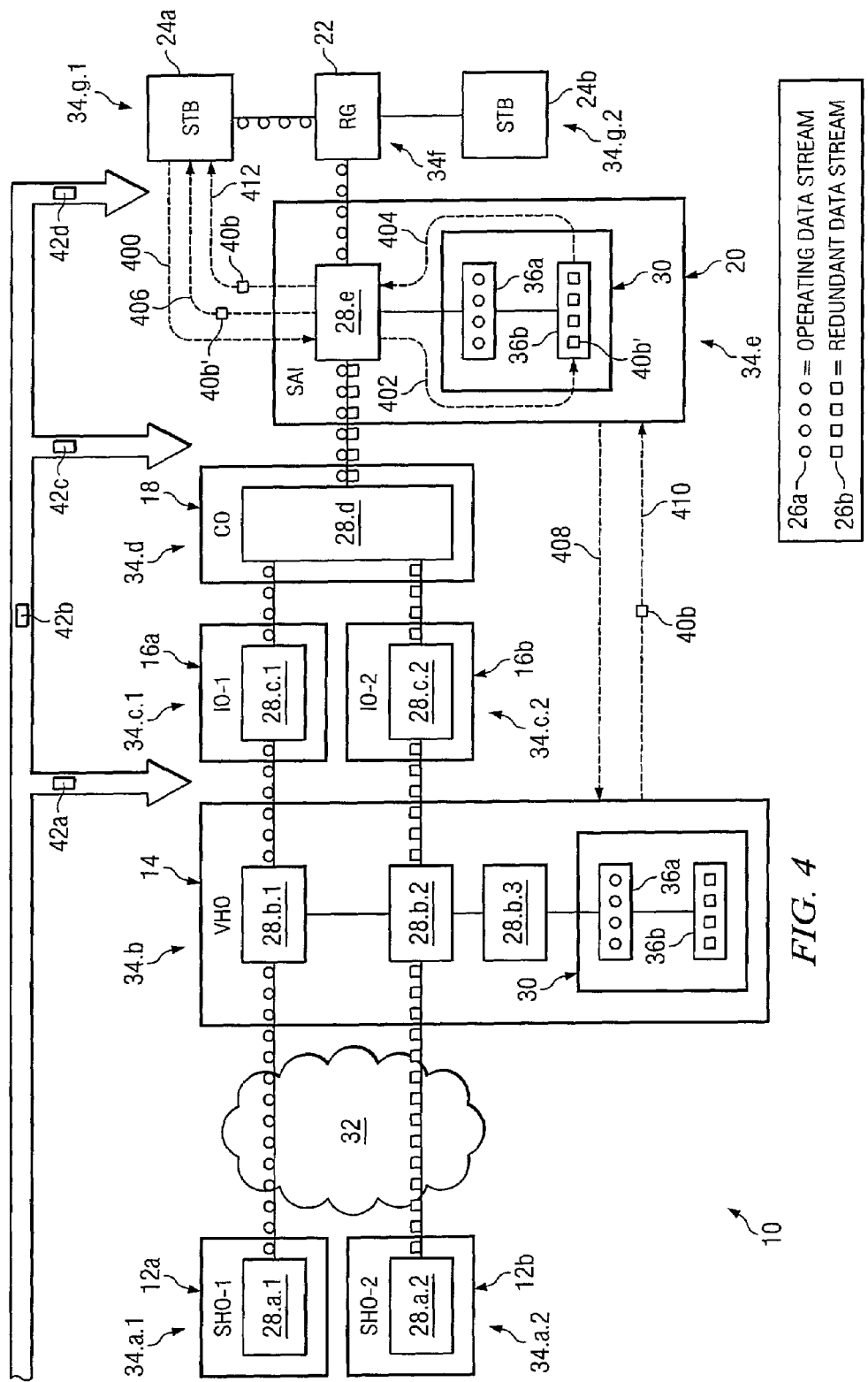
FIG. 4 illustrates an example operation of the IPTV network in a scenario in which one or more packets of a operating data stream are lost, according to certain embodiments of the present invention.

FIG. 4 illustrates example operation of IPTV network 10 in a scenario in which one or more packets 42 of operating data stream 26a are lost, according to certain embodiments of the present invention. In this particular example, it will be assumed that packet 42b is a lost packet. Each packet 42 may be associated with a particular channel of the data stream 26 of which the packet 42 is a part.

In the example illustrated in FIG. 4, an occurrence of a lost packet 42b in operating data stream 26a may be detected. In certain embodiments, an endpoint 24 (e.g., endpoint 24a) detects that a packet 42b has been lost. As indicated at arrow 400, endpoint 24a may communicate a request for the detected lost packet to D-Server 30 of SAI 20. The request for lost packet 42b may include an identifier of a particular channel associated with lost packet 42b.

D-Server 30 may receive the request for lost packet 42b. In response to the request for lost packet 42b, D-Server 30 may access redundant data stream 26b buffered in second buffer 34b, as indicated at arrow 402. D-Server 30 may determine whether redundant data stream 26b buffered in second buffer 34b comprises data for the particular channel associated with lost packet 42b.

If D-Server 30 determines that redundant data stream 26b buffered in second buffer 34b comprises data for the particular channel associated with lost packet 42b, then D-Server 30 may retrieve, from redundant data stream 26b buffered in second buffer 34b, a packet 42b' that corresponds to lost packet 42b, as indicated at arrow 404. As indicated at arrow 406, D-Server 30 may provide packet 42b' retrieved from redundant data stream 26b buffered in second buffer 34b to endpoint 24a. For example, D-Server 30 may communicate packet 42b' to endpoint 24a as a unicast signal.

If it is determined that redundant data stream 26b buffered in second buffer 34b does not comprise data for the particular channel associated with lost packet 42b, then, as indicated at arrow 408, D-Server 30 may generate a retransmission request for lost packet 42b. For example, D-Server 30 may communicate a retransmission request for lost packet 42b to an upstream A-Server (e.g., an A-Server of VHO 14). As indicated at step 410, D-Server 30 may receive, in response to the retransmission request, a copy of lost packet 42b. As indicated at arrow 412, D-Server 30 may provide the copy of lost packet 42b received in response to the retransmission request to endpoint 24a. For example, D-Server 30 may communicate the received copy of lost packet 42b to endpoint 24a as a unicast signal.

In conventional IPTV networks, when an endpoint, such as a set-top box, detects the occurrence of a lost packet, the endpoint requests the lost packet from an upstream D-Server (e.g., a D-Server associated with an SAI). The D-Server submits a retransmission request to an upstream A-Server (e.g., the A-Server associated with a VHO). In typical IPTV networks, many D-Servers may be associated with a VHO, and each D-Server is associated with many endpoints. When a lost packet occurs deep in the IPTV network (e.g., at some point closer to the VHO than the SAI), then multiple D-Servers may be affected by the packet loss, and each endpoint associated with those affected D-Servers may also be affected by the packet loss. Since the lost packet occurred deep in the IPTV network, the D-Servers will not have the lost packet in their buffers because the lost packet was never received. Therefore, each of the many D-Servers may request the lost packet from the A-Server. This may be particularly problematic if there is a large end-user base in need of the lost packet (e.g., many end users are tuned to the channel associated with the lost packet).

In contrast, according to certain embodiments of the present invention, regardless of whether the lost packet occurs deep in the network, the D-Server will have a backup corresponding packet buffered in the second buffer (assuming the channel associated with the lost packet is a part of redundant data stream 26b).

Figure 5:
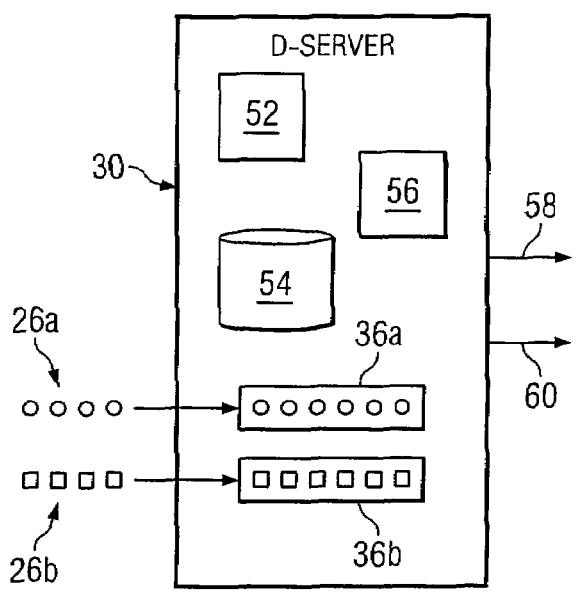
FIG. 5 illustrates an example D-Server that may be associated with a node in the IPTV network.

FIG. 5 illustrates an example D-Server 30 that may be associated with a node 14 in IPTV network 10. As described above, although D-Server 30 is primarily described as a D-Server, D-Server 30 may comprise any suitable type of server system according to particular needs. Although a particular implementation of D-Server 30 is illustrated and described, the present invention contemplates D-Server 30 comprising any suitable implementation according to particular needs.

D-Server 30 may include one or more processing units 52 and one or more memory units 54. The one or more processing units 52 may be any suitable types of processing units, according to particular needs. Memory units 54 may include any memory or database modules and may take the form of volatile or non-volatile memory including, without limitation, magnetic media, optical media, random access memory (RAM), read-only memory (ROM), removable media, or any other suitable local or memory component. D-Server 30 may include any suitable number of memory units 54. Memory units 54 may be integral to or external from D-Server 30. For example, memory units 54 may be integral to D-Server 30 or may be coupled to D-Server 30 using one or more links.

D-Server 30 may include first buffer 36a for storing operating data stream 26a and second buffer 36b for buffering redundant data stream 26b. D-Server 30 may receive operating data stream 26a and buffer the received operating data stream 26a in buffer 36a. D-Server 30 may receive redundant data stream 26b and buffer the received redundant data stream 26b in buffer 36b. In certain embodiments, D-Server 30 receives operating data stream 26a and redundant data stream 26b substantially simultaneously, such that the contents of first buffer 34a and second buffer 34b are substantially the same (i.e., for those channels in the subset of the plurality of channels). Buffers 36a and 36b may be stored in the one or more memory units 54 of D-Server 30 or at any other suitable location.

D-Server 30 may include a logic component 56 that is operable to perform the functions of D-Server 30. Logic component 56 may include any suitable combination of software, firmware, and hardware. In certain embodiments, logic component 56 comprises software that is operable to perform certain functions when executed by processor 52. As an example, logic component 56 may be operable to manage the receipt of operating data stream 26a and redundant data stream 26b, and the buffering of those data streams in the appropriate buffer 36. Additionally or alternatively, logic component 56 may facilitate the transmission of a portion or all of the data streams 26 from D-Server 30. For example, logic component 56 may facilitate the transmission of one or more multicast streams 58 from D-Server 30 in the direction of one or more endpoints 24. As another example, logic component 56 may facilitate the transmission of one or more unicast streams 60 from D-Server 30 in the direction of one or more endpoints 24.

In operation of an example embodiment of system 10, D-Server 30 may receive operating data stream 26a associated with the operating multicast tree. As described above, the operating multicast tree may comprise a first set of nodes 34 and components 28 that are operable to process operating data stream 26a to facilitate delivery of one or more channels to one or more endpoints 24. D-Server 20 may buffer operating data stream 26a in an operating data stream buffer 36a. D-Server 30 may receive redundant data stream 26b associated with the proactively-established redundant multicast tree, the redundant multicast tree comprising a second set of nodes 34 and components 28. D-Server 30 may proactively buffer redundant data stream 26b in redundant data stream buffer 36b. In certain embodiments, D-Server 30 receives and buffers operating data stream 26a and redundant data stream 26b substantially simultaneously.

In certain embodiments, D-Server 30 is operable to improve handling of failures within IPTV network 10. In operation of an example embodiment of D-Server 30, the one or more processing units 52 (possibly in combination with logic component 56) may be operable to detect a failure in the operating multicast tree, the failure affecting delivery of a particular channel to a particular endpoint 24a. For example, D-Server 30 may receive from endpoint 24a a request for a unicast stream of the particular channel, the particular channel having been previously provided to endpoint 24a from the operating data stream buffered in first buffer 36a. In response to the request, D-Server 30 may access redundant data stream 26b buffered in second buffer 36b. D-Server 30 may determine whether redundant data stream 26b buffered in second buffer 36b comprises data for the particular channel of the request.

D-Server 30 may provide, if it is determined that redundant data stream 26b buffered in second buffer 36b comprises data for the particular channel of the request, the particular channel to endpoint 24a using redundant data stream 26b buffered in second buffer 36b. For example, D-Server 30 may provide from redundant data stream 26b buffered in second buffer 36b a unicast stream of data for the particular channel, add endpoint 24a to the redundant multicast tree as a node 34 of the redundant multicast tree, and provide data for the particular channel from redundant data stream 26b buffered in second buffer 36b to endpoint 24a as part of redundant data stream 26b of the redundant multicast tree.

In certain embodiments, D-Server 30 is operable, subsequent to resolving the failure in the operating multicast tree, to return endpoint 24a to the operating multicast tree and provide data for the particular channel from operating data stream 26a buffered in first buffer 36a to endpoint 24a as part of operating data stream 26a of the operating multicast tree.

In certain embodiments, D-Server 30 is operable to improve handling of lost packets within IPTV network 10. In operation of an example embodiment of D-Server 30, the one or more processing units 52 (possibly in combination with logic component 56) may be operable to detect an occurrence of a lost packet (e.g., lost packet 42b) in operating data stream 26a. For example, D-Server 30 may detect the occurrence of the lost packet by receiving from a particular endpoint 24a a request for the lost packet, the lost packet being associated with a particular channel. D-Server 30 may access redundant data stream 26b buffered in second buffer 36b. D-Server may determine whether redundant data stream 26b buffered in second buffer 36b comprises data for the particular channel associated with the lost packet.

D-Server 30 may be operable, if it is determined that redundant data stream 26b buffered in second buffer 36b comprises data for the particular channel associated with the lost packet, to retrieve, from redundant data stream 26b buffered in second buffer 26b, a packet that corresponds to the lost packet and provide the packet retrieved from redundant data stream 26b buffered in second buffer 36b to endpoint 24a. D-Server 30 may be operable, if it is determined that redundant data stream 26b buffered in second buffer 36b does not comprise data for the particular channel associated with the lost packet, to generate a retransmission request for the lost packet, receive, in response to the retransmission request, a copy of the lost packet, and provide the copy of the lost packet received in response to the retransmission request to endpoint 24a. For example, D-Server 30 may communicate the retransmission request to an upstream A-Server, such as an A-Server associated with VHO 14.

Particular embodiments of the present invention may provide one or more technical advantages. In certain embodiments, in addition to redundancy at one or more of the node level and the component level of IPTV network 10, the present invention may provide redundancy at the path level of IPTV network 10. For example, the proactively-established redundant multicast tree and redundant data stream 26b may proactively provide a backup for the operating multicast tree and operating data stream 26a.

In certain embodiments, the present invention may reduce or eliminate problems associated with conventional techniques for resolving a failure in an IPTV multicast tree. For example, certain embodiments may reduce or eliminate problems with performing a failover upon detection of a failure 40 in an operating multicast tree of IPTV network 10. As a particular example, the present invention may reduce or eliminate the need to update SSM translation tables, to wait for PIM-SSM to build the multicast tree sourced from the second SHO 12b with a component to which the failover is performed, or to perform other actions related to execution of a failover.

In certain embodiments, reducing or eliminating problems caused by conventional failover techniques may reduce or eliminate the possibility that an end user will be affected by a failure in IPTV network 10, which may improve customer satisfaction. This may be especially true when there is a large customer base. In certain embodiments, the present invention uses the MICROSOFT instant channel change mechanism of D-Servers 30 in IPTV network 10 to accelerate resolution of failures.

In certain embodiments, the present invention improves the speed and/or efficiency with which IPTV network 10 handles lost packets 42*b*. For example, certain embodiments may reduce or eliminate retransmission storms from one or more D-Servers 30 to one or more A-Servers. Certain embodiments may accelerate retransmission and reduce or eliminate requests from a D-Server 30 to an A-Server for a detected lost packet 42*b*. For example, in response to a request for a lost packet 42*b* from an endpoint 24 (e.g., a set top box), D-Server 30 may provide the lost packet 42*b*' from redundant data stream 26*b* of the redundant multicast tree rather than request the lost packet 42*b* from the A-Server. This may be particularly beneficial if a large number of users are impacted by the occurrence of the lost packet 42*b*, since D-Server 30 typically handles a smaller customer base relative to the A-Server. This may improve customer satisfaction by reducing or eliminating the likelihood that an end user will be affected by a lost packet 42*b*.

In certain embodiments, the present invention may provide one or more of these or other advantages without excessively burdening system 10 due to the maintenance and processing associated with the addition of the redundant multicast tree. For example, assume that ten to twenty percent of the channels of operating data stream 26*a* are popular (defined, for purposes of this example, as seventy to eighty percent of the customer base watches those channels). Additionally, assume that there are approximately five hundred available channels (e.g., three hundred fifty standard definition channels and one hundred fifty high definition channels), and that these five hundred channels are delivered using approximately one thousand five hundred multicast trees (i.e., in certain embodiments, a channel may be delivered using multiple data streams, each forming its own multicast tree). If it is determined that only data for the popular channels should be included in redundant data stream 26*b* (e.g., ten to twenty percent of the channels of the operating data stream), then (350SD+150HD)*10%-20%=50-100 proactive redundant multicast trees. The fifty to one hundred proactive multicast tress is less than ten percent of the approximately one thousand five hundred total multicast trees, which may improve the experience of more than fifty percent of the customer base (i.e., the channels for which data is included in redundant multicast stream 26*b* are watched by seventy to eighty percent of the customer base, in this example).

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A method for proactively providing a redundant multicast tree in an Internet Protocol Television (IPTV) network, comprising:
    establishing an operating multicast tree comprising a first set of nodes and components, the first set of nodes and components of the operating multicast tree operable to process an operating data stream to facilitate delivery of one or more channels to one or more endpoints;
    proactively establishing a redundant multicast tree comprising a second set of nodes and components, the second set of nodes and components:
        comprising at least one node or at least one component that is redundant of a corresponding node or component in the first set of nodes and components of the operating multicast tree, and that is not in the first set of nodes and components of the operating multicast tree; and
        operable to process a redundant data stream; and
    the IPTV network comprises a delivery server (D-Server) that comprises the one or more buffers, the one or more buffers comprising a first buffer and a second buffer; and
    buffering the operating data stream in the first buffer;
    buffering the redundant data stream in the second buffer;
    detecting a failure in the operating multicast tree, the failure affecting delivery of a particular channel to a particular endpoint, wherein the detecting step further includes a step of receiving from the particular endpoint a request for a unicast stream of the particular channel, the particular channel having been previously provided to the particular endpoint from the operating data stream buffered in the first buffer;
    accessing the redundant data stream buffered in the second buffer;
    determining whether the redundant data stream buffered in the second buffer comprises data for the particular channel of the request;
    providing, if it is determined that the redundant data stream buffered in the second buffer comprises data for the particular channel of the request, the particular channel to the particular endpoint using the redundant data stream buffered in the second buffer by:
        providing from the redundant data stream buffered in the second buffer a unicast stream of data for the particular channel;
        adding the particular endpoint to the redundant multicast tree as a node of the redundant multicast tree; and
        providing data for the particular channel from the redundant data stream buffered in the second buffer to the particular endpoint as part of the redundant data stream of the redundant multicast tree.

2. The method of claim 1, comprising, subsequent to resolving the failure in the operating multicast tree:
    returning the particular endpoint to the operating multicast tree; and
    providing data for the particular channel from the operating data stream buffered in the first buffer to the particular endpoint as part of the operating data stream of the operating multicast tree.

3. The method of claim 1, wherein:
    the operating data stream comprises data for a plurality of channels; and
    the redundant data stream comprises data for a subset of the plurality of channels of the operating data stream.

4. The method of the claim 3, wherein the subset comprises all of the plurality of channels.

5. The method of claim 1, wherein:
    a root node of the operating multicast tree comprises a first super headend office (SHO), the operating data stream being sourced from the first SHO; and
    a root node of the redundant multicast tree comprises a second SHO, the redundant data stream being sourced from the second SHO.

6. The method of claim 1, wherein the operating multicast tree and the redundant multicast tree comprise one or more nodes or components that are shared between the operating multicast tree and the redundant multicast tree.

7. The method of claim 1, comprising maximizing the redundancy of the redundant multicast tree.

8. The method of claim 1, wherein the one or more endpoints comprise set-top boxes.

9. A method for proactively providing a redundant multicast tree in an Internet Protocol Television (IPTV) network, comprising:
   establishing an operating multicast tree comprising a first set of nodes and components, the first set of nodes and components of the operating multicast tree operable to process an operating data stream to facilitate delivery of one or more channels to one or more endpoints;
   proactively establishing a redundant multicast tree comprising a second set of nodes and components, the second set of nodes and components:
      comprising at least one node or at least one component that is redundant of a corresponding node or component in the first set of nodes and components of the operating multicast tree, and that is not in the first set of nodes and components of the operating multicast tree; and
      operable to process a redundant data stream; and
   the IPTV network comprises a delivery server (D-Server) that comprises the one or more buffers, the one or more buffers comprising a first buffer and a second buffer; and
   buffering the operating data stream in the first buffer;
   buffering the redundant data stream in the second buffer;
   detecting the occurrence of the lost packet in the operating data stream by receiving from a particular endpoint a request for the lost packet, the lost packet being associated with a particular channel;
   determining whether the redundant data stream buffered in the second buffer comprises data for the particular channel associated with the lost packet; and
   if it is determined that the redundant data stream buffered in the second buffer comprises data for the particular channel associated with the lost packet:
      retrieving, from the redundant data stream buffered in the second buffer, a packet that corresponds to the lost packet; and
      providing the packet retrieved from the redundant data stream buffered in the second buffer to the particular endpoint.

10. The method of claim 9, comprising, if it is determined that the redundant data stream buffered in the second buffer does not comprise data for the particular channel associated with the lost packet:
   generating a retransmission request for the lost packet;
   receiving, in response to the retransmission request, a copy of the lost packet; and
   providing the copy of the lost packet received in response to the retransmission request to the particular endpoint.

11. The method of claim 9, wherein:
   the operating data stream comprises data for a plurality of channels; and
   the redundant data stream comprises data for a subset of the plurality of channels of the operating data stream.

12. The method of the claim 11, wherein the subset comprises all of the plurality of channels.

13. The method of claim 9, wherein:
   a root node of the operating multicast tree comprises a first super headend office (SHO), the operating data stream being sourced from the first SHO; and
   a root node of the redundant multicast tree comprises a second SHO, the redundant data stream being sourced from the second SHO.

14. The method of claim 9, wherein the operating multicast tree and the redundant multicast tree comprise one or more nodes or components that are shared between the operating multicast tree and the redundant multicast tree.

15. The method of claim 9, comprising maximizing the redundancy of the redundant multicast tree.

16. The method of claim 9, wherein the one or more endpoints comprise set-top boxes.

17. An Internet Protocol Television (IPTV) network, comprising:
   an operating multicast tree comprising a first set of nodes and components, the first set of nodes and components of the operating multicast tree operable to process an operating data stream to facilitate delivery of one or more channels to one or more endpoints;
   a proactively-established redundant multicast tree comprising a second set of nodes and components, the second set of nodes and components:
      comprising at least one node or at least one component that is redundant of a corresponding node or component in the first set of nodes and components of the operating multicast tree, and that is not in the first set of nodes and components of the operating multicast tree; and
      operable to process a redundant data stream; and
   the network comprises a delivery server (D-Server) that comprises the one or more buffers, the one or more buffers comprising a first buffer and a second buffer, the D-Server operable to:
   buffer the operating data stream in the first buffer; and
   buffer the redundant data stream in the second buffer; and
   the network is further operable to:
   detect a failure in the operating multicast tree, the failure affecting delivery of a particular channel to a particular endpoint, where the failure is detected by receiving from the particular endpoint a request for a unicast stream of the particular channel, the particular channel having been previously provided to the particular endpoint from the operating data stream buffered in the first buffer;
   access the redundant data stream buffered in the second buffer;
   determine whether the redundant data stream buffered in the second buffer comprises data for the particular channel of the request;
   provide, if it is determined that the redundant data stream buffered in the second buffer comprises data for the particular channel of the request, the particular channel to the particular endpoint using the redundant data stream buffered in the second buffer by:
      providing from the redundant data stream buffered in the second buffer a unicast stream of data for the particular channel;
      adding the particular endpoint to the redundant multicast tree as a node of the redundant multicast tree; and
      providing data for the particular channel from the redundant data stream buffered in the second buffer to the particular endpoint as part of the redundant data stream of the redundant multicast tree.

18. An Internet Protocol Television (IPTV) network, comprising:
   an operating multicast tree comprising a first set of nodes and components, the first set of nodes and components of the operating multicast tree operable to process an operating data stream to facilitate delivery of one or more channels to one or more endpoints;
a proactively-established redundant multicast tree comprising a second set of nodes and components, the second set of nodes and components:
  comprising at least one node or at least one component that is redundant of a corresponding node or component in the first set of nodes and components of the operating multicast tree, and that is not in the first set of nodes and components of the operating multicast tree; and
  operable to process a redundant data stream;
the network comprises a delivery server (D-Server) that comprises the one or more buffers, the one or more buffers comprising a first buffer and a second buffer, the D-Server operable to:
buffer the operating data stream in the first buffer; and
buffer the redundant data stream in the second buffer; and
the network is further operable to:
detect the occurrence of the lost packet in the operating data stream by receiving from a particular endpoint a request for the lost packet, the lost packet being associated with a particular channel;
determine whether the redundant data stream buffered in the second buffer comprises data for the particular channel associated with the lost packet; and
if it is determined that the redundant data stream buffered in the second buffer comprises data for the particular channel associated with the lost packet:
  retrieve, from the redundant data stream buffered in the second buffer, a packet that corresponds to the lost packet; and
  provide the packet retrieved from the redundant data stream buffered in the second buffer to the particular endpoint.

19. Logic for proactively providing a redundant multicast tree in an Internet Protocol Television (IPTV) network, the logic encoded in media and when executed operable to:
  provide an operating multicast tree comprising a first set of nodes and components, the first set of nodes and components of the operating multicast tree operable to process an operating data stream to facilitate delivery of one or more channels to one or more endpoints;
  provide a proactively-established redundant multicast tree comprising a second set of nodes and components, the second set of nodes and components:
    comprising at least one node or at least one component that is redundant of a corresponding node or component in the first set of nodes and components of the operating multicast tree, and that is not in the first set of nodes and components of the operating multicast tree; and
    operable to process a redundant data stream; and
  the network comprises a delivery server (D-Server) that comprises the one or more buffers, the one or more buffers comprising a first buffer and a second buffer, the D-Server operable to:
  buffer the operating data stream in the first buffer; and
  buffer the redundant data stream in the second buffer; and
  the network is further operable to:
  detect a failure in the operating multicast tree, the failure affecting delivery of a particular channel to a particular endpoint, where the failure is detected by receiving from the particular endpoint a request for a unicast stream of the particular channel, the particular channel having been previously provided to the particular endpoint from the operating data stream buffered in the first buffer;
  access the redundant data stream buffered in the second buffer;
  determine whether the redundant data stream buffered in the second buffer comprises data for the particular channel of the request;
  provide, if it is determined that the redundant data stream buffered in the second buffer comprises data for the particular channel of the request, the particular channel to the particular endpoint using the redundant data stream buffered in the second buffer by:
    providing from the redundant data stream buffered in the second buffer a unicast stream of data for the particular channel;
    adding the particular endpoint to the redundant multicast tree as a node of the redundant multicast tree; and
    providing data for the particular channel from the redundant data stream buffered in the second buffer to the particular endpoint as part of the redundant data stream of the redundant multicast tree.

20. Logic for proactively providing a redundant multicast tree in an Internet Protocol Television (IPTV) network, the logic encoded in media and when executed operable to:
  provide an operating multicast tree comprising a first set of nodes and components, the first set of nodes and components of the operating multicast tree operable to process an operating data stream to facilitate delivery of one or more channels to one or more endpoints;
  provide a proactively-established redundant multi cast tree comprising a second set of nodes and components, the second set of nodes and components:
    comprising at least one node or at least one component that is redundant of a corresponding node or component in the first set of nodes and components of the operating multicast tree, and that is not in the first set of nodes and components of the operating multicast tree; and
  operable to process a redundant data stream;
  the network comprises a delivery server (D-Server) that comprises the one or more buffers, the one or more buffers comprising a first buffer and a second buffer, the D-Server operable to:
  buffer the operating data stream in the first buffer; and
  buffer the redundant data stream in the second buffer; and
  the network is further operable to:
  detect the occurrence of the lost packet in the operating data stream by receiving from a particular endpoint a request for the lost packet, the lost packet being associated with a particular channel;
  determine whether the redundant data stream buffered in the second buffer comprises data for the particular channel associated with the lost packet; and
  if it is determined that the redundant data stream buffered in the second buffer comprises data for the particular channel associated with the lost packet:
    retrieve, from the redundant data stream buffered in the second buffer, a packet that corresponds to the lost packet; and
    provide the packet retrieved from the redundant data stream buffered in the second buffer to the particular endpoint.

* * * * *

UNITED STATES PATENT AND TRADEMARK OFFICE
CERTIFICATE OF CORRECTION

PATENT NO. : 7,573,875 B2
APPLICATION NO. : 11/419236
DATED : August 11, 2009
INVENTOR(S) : Hakki Candan Cankaya It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 516 days.

Signed and Sealed this

Seventh Day of September, 2010

David J. Kappos
*Director of the United States Patent and Trademark Office*